(12) United States Patent
Blanding

(10) Patent No.: US 8,271,818 B2
(45) Date of Patent: Sep. 18, 2012

(54) MANAGING UNDER-UTILIZED RESOURCES IN A COMPUTER

(75) Inventor: William H. Blanding, Bow, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 583 days.

(21) Appl. No.: 12/453,148

(22) Filed: Apr. 30, 2009

(65) Prior Publication Data

US 2010/0281285 A1 Nov. 4, 2010

(51) Int. Cl.
 G06F 1/32 (2006.01)
 G06F 9/46 (2006.01)
(52) U.S. Cl. ........ 713/324; 713/323; 718/104; 718/105
(58) Field of Classification Search ............... 713/321, 713/323, 324; 718/104, 105; 710/240
See application file for complete search history.

(56) References Cited

U.S. PATENT DOCUMENTS

| | | | | |
|---|---|---|---|---|
| 7,644,148 B2* | 1/2010 | Ranganathan et al. | ....... | 709/223 |
| 7,757,233 B2* | 7/2010 | Mukherjee | .................... | 718/100 |
| 8,010,822 B2* | 8/2011 | Marshall et al. | ............... | 713/324 |
| 2005/0060590 A1* | 3/2005 | Bradley et al. | ................. | 713/320 |
| 2007/0234365 A1* | 10/2007 | Savit | .............................. | 718/104 |
| 2008/0034370 A1* | 2/2008 | Huizenga | ....................... | 718/104 |
| 2009/0100435 A1* | 4/2009 | Papaefstathiou et al. | ..... | 718/104 |
| 2010/0005473 A1* | 1/2010 | Blanding et al. | .............. | 718/104 |
| 2010/0106990 A1* | 4/2010 | Kalman | ........................ | 713/323 |
| 2011/0055605 A1* | 3/2011 | Jackson | ......................... | 713/320 |

OTHER PUBLICATIONS

"Star-P On-Demand: easy, affordable apy-per-use supercomputing for the masses" (press release); Beaupre & Co. Public Relations for Interactive Supercomuting, Inc.; Waltham, Mass.; Apr. 1, 2008.*

* cited by examiner

*Primary Examiner* — Glenn A Auve

(57) ABSTRACT

A method, and a corresponding system, for managing under-utilized resources in a computer system includes the steps of monitoring performance of workloads executing on the computer system, where the workloads consume resources, determining resource demand and utilization by the workloads, comparing the workload performance to user-defined performance targets and resource utilization by the workloads to user-defined utilization targets, using the comparison results, determining if one or more resources may be assigned to a free resource pool, and assigning the determined resources to the free resource pool.

22 Claims, 4 Drawing Sheets

MANAGING UNDER-UTILIZED RESOURCES IN A COMPUTER

BACKGROUND

Current computer systems typically employ multiple instances of resources, some of which may be used on an as-needed basis, and/or according to one or more policies designated by a computer system administrator. Use and monitoring of the resources may be aided by a Workload Management System (WLMS), which is a computer program resident on the computer system, or connected to the computer system. These resources, while not always actively employed in executing programming tasks, nonetheless are powered on, thereby consuming energy directly, and also generating heat, with a consequent requirement to supply additional cooling, another source of energy consumption.

DESCRIPTION OF THE DRAWINGS

The Detailed Description will refer to the following drawings in which like numbers refer to like items, and in which.

DETAILED DESCRIPTION

Figure 1:
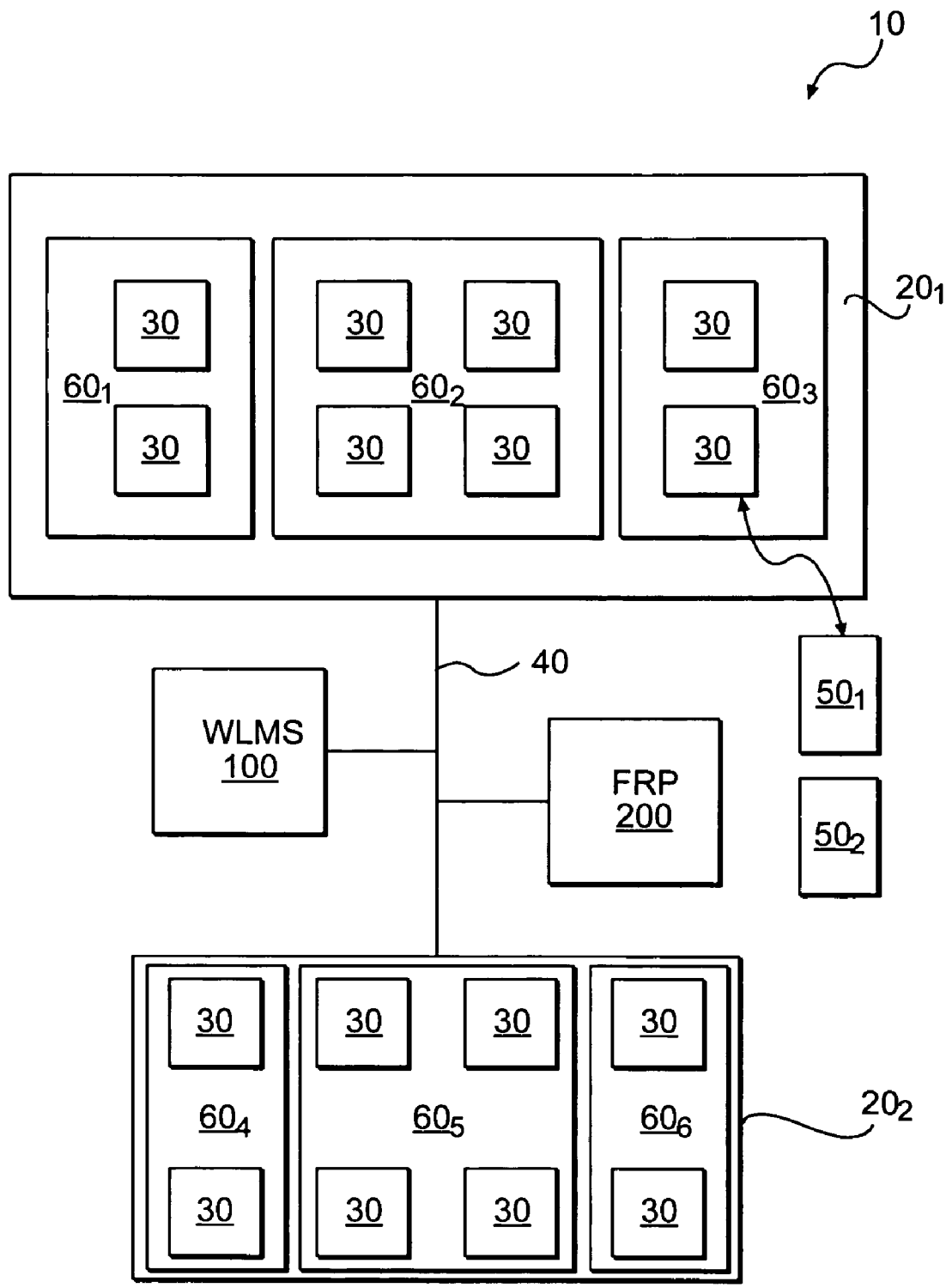
FIG. 1 is a block diagram of an exemplary computer system on which under-utilized resources are managed.

Computer systems that employ a number of resources often operate with some of those resources in an "idle" mode. That is, some resources are powered up, consuming electricity, (i.e., direct energy consumption) and generating heat (i.e., indirect energy consumption), but are not performing any specific functions. More specifically, a computer system may be configured with several processors, but only a subset of those processors is executing workloads during certain times of a day. The remaining processors are idle and available for processing functions when workload demand increases. While idle, the processors are powered on, which consumes some amount of power, and which also generates some amount of heat, which in turn must be removed by operating a cooling system. In a sense, the power consumed by idle processors, and the power required to remove the heat generated by idle processors, is wasted. One solution to this excess power consumption usage is to turn the processors off. However, a processor that is turned off may not be quickly available should there be a sudden surge in processor demand by workloads executing on the computer system. Described below is a system and corresponding method for managing a computer system's under-utilized resources. By managing these under-utilized resources, the system and method provide for conserving energy consumption by the computer system while at the same time ensuring rapid availability of computer system resources by assigning the computer system resources to free resource pools.

To achieve this energy conservation, an exemplary workload management system (WLMS) permits one or more free resource pools to be established. Using this WLMS, a computer system user may assign policies to the free resource pools which, in conjunction with policies normally applied to workloads under management by the WLMS, are used to determine the allocation of resources among the workloads and the free resource pools. The WLMS periodically samples various operating parameters of the workloads during a computing period (e.g., every minute), and uses this information, along with previous measurements and the user specified policy parameters to make an allocation for the following computing period and then assigns resources to workloads or free pools according to this allocation. Thus, workloads are assigned resources according to their resource demands as filtered by the user-specified policies and unneeded or under-utilized resources are assigned to free resource pools.

Resources assigned to free resources pools are considered "unavailable", or "de-activated" and thus are not available for assignment to any workload. In an embodiment, when assigned to a free resource pool, in addition to being deactivated, the resources are placed in power saving modes of operation according to built-in and/or user provided rules. Placement of the resources in power saving modes may be automatic and coincident with assignment to the free resource pools. Alternatively, the resources assigned to the free resource pools may be reviewed periodically (e.g., every minute) and a change in power saving mode for one or more of the resources assigned to the free resource pools may be effectuated. Note that a change in power saving mode may occur in two directions: namely, a resource may be placed in a more restrictive mode or a less restrictive power saving mode. Whether immediate and automatic, or based on periodic review, specific power saving modes can be selected according to the history of allocation of resources to the free resource pool and the characteristics of the power saving mode. For example, reduced power modes which may be entered and exited rapidly are appropriate for that portion of the free resource pool that is more volatile and modes that are entered and exited slowly are appropriate for the less volatile portion of a free resource pool's resources. One way to determine if a resource is "volatile" or "non-volatile" is to graph, or note, the amount of time that resource spends in a free resource pool. Resources that remain in the free resource pool for extensive times would then be considered non-volatile. As resource demand changes over time, specific resources may move into or out of the free resource pool rapidly. These later resources would then be considered as volatile.

Other functions in the operating environment can take advantage of the assignment of resources to free resource pools to activate power saving modes. For example, the act of placing resources in an operating state that is consistent with assignment to a free resource pool (e.g., deactivating a processor not assigned to any partition) may be used as a trigger for entering a power saving mode.

Some advantages of such a WLMS are: 1) automatic management for energy conservation in a multi-partition, shared resource environment, while still providing managed workloads with the resources they require; 2) resource allocation to workloads and reservation from use for energy conservation purposes according to user-defined policies—hence resources may be reserved for energy conservation purposes because the resources are automatically determined to be not presently needed by any workload, or because the computer system user causes them to be reserved, in effect overriding some of the workload demand for resources; and 3) free resource pools also are useful for purposes other than energy conservation, such as limiting the availability of resources to workloads by placing appropriate policies on the free resource pools—one such "other" purpose is reducing direct energy consumption associated with using certain pay-per-use resources.

FIG. 1 is a block diagram of an exemplary computer system 10 on which under-utilized resources are managed and on which assignment of computer system resources to free resource pools is implemented. The computer system 10 includes multiple instances of processors 30 physically located at servers 20, with the servers 20 connected by network 40. Workloads 50 may, from time-to-time, execute on the processors 30. At least some processors 30 may be assigned to partitions 60, as shown. Thus, the computing nodes over which workloads execute include servers, processors, and partitions. The computer system 10 also includes workload management system (WLMS) 100 that performs specific monitoring and control functions related to the workloads 50 and the components of the computer system 10.

The partitions 60 may include "hard partitions" and "soft partitions." In FIG. 1, server 20, contains soft partitions, $60_1$, $60_2$ and $60_3$. Server 202 contains hard partitions $60_4$, $60_5$, and $60_6$. Processors 30 assigned to the soft partitions may be shared across boundaries of the soft partitions. Processors 30 assigned to hard partitions are shared only within their assigned hard partitions. Similarly, processors 30 from soft partitions that are assigned to a free resource pool may be used in any other soft partition, after re-activation of the processor, while processors 30 from hard partitions may be used only in its original hard partition.

Although the discussion that follows often will refer to computer resources as processors (whether or not partitioned) and virtual machines, and physical and logical servers, those skilled in the art will recognize that such resources may include other resource types including memory and bandwidth, for example. Furthermore, resource types may include separate computer systems. Finally, the discussion will refer to resource instances, which means a specific instantiation.

Assigned to certain processors 30 in partition $60_3$ is part or all of workload $50_1$, where the workload $50_1$ in whole or in part as assigned, executes on the processors 30 of partition $60_3$. Ideally, the assignment of processors 30 and partitions 60 is matched to the demands by the workloads 50 such that execution of a workload 50 occurs at some minimum resource cost, such as at the point of minimum energy consumption. That is, if more processors 30 and/or partitions 60 than necessary are assigned to the workload 50, operation of the computer system 10 will occur at a higher energy consumption cost than is necessary. Thus, optimizing the assignment of workloads to processors/partitions may lead to cost savings by reducing electrical demand to operate the processors/partitions, and by reducing the cooling load imposed by operation of the excess processors/partitions.

However, to ensure sufficient (or desired) resource capacity at all times, the computer system 10 has installed more processors than may be needed at all times of a day, or all days of a year. That is, the computer system 10 includes sufficient processor capacity to satisfy expected or historical workload demand variations over time. Some of the "extra" processor capacity may come in the form of pay-per-use processors; other "extra" processor capacity may come in the form of processors for which the computer system owner has acquired full usage rights. In prior art computer systems to ensure that the "extra" processor capacity is readily available should workload demand increase, such "extra" processor capacity is always powered on, resulting in unnecessary direct and indirect energy consumption. In contrast, the exemplary computer system 10 of FIG. 1 includes one or more free resource pools 200, to which any of the processors 30 may be assigned, at any time. The resource pools 200 can be likened to virtual partitions in a multi-processor computer system. That is, the resource pools 200 exist as programming devices on the computer system 10. Assignment of a resource to a free resource pool 200 deactivates that resource, making that resource unavailable to support any workload. However, removing the resource from the free resource pool 200 reactivates the resource, making that resource available only for certain workloads. More specifically, consider the situation of workload $50_2$, being executed on processors 30 assigned to partition $60_4$. Should one of the processors 30 from hard partition $60_5$ be removed from the free resource pool, that processor would not be available to support the execution of workload $50_2$. Thus, the topology of the computer system 10 affects the availability of resources exiting the resource pools 200.

In an embodiment, the resource pools 200 include specific functions such that when a resource (e.g., a processor 30) is assigned to a resource pool 200, a specific action or routine is executed with respect to that resource. Similarly, when the resource is de-assigned (i.e., removed) from the free resource pool 200, the routine is reversed. For example, assignment of a processor 30 to a free resource pool 200 may cause execution of a routine to shut down the processor 30. Removal of the processor 30 from the free resource pool 200 causes the processor 30 to restart. As will be described bellow, such assignment of processors to free resource pools 200 reduces direct and indirect energy consumption by the computer system 10.

In an alternative embodiment, resources assigned to a free resource pool may initially be deactivated only. A subsequent review by the WLMS 100 of the resources populating the free resource pool 200 then leads to a change in the power saving mode of one or more of the resources in the free resource pool. For example, the WLMS 100 may review the status of each of the processors 30 assigned to the free resource pool each computing period, where a computing period may be any specified time, such as a minute. Based on this review, the WLMS 100 may initiate action to place one or more of the processors 30 in a power saving mode, remove one or more processors 30 from a power saving mode, or change the power saving mode of one or more processors 30 to a different power saving mode. For example, upon review, the WLMS 100 may direct that a specific processor 30 that is operating in a reduced frequency power saving mode be powered off, while a different processor 30 that is powered off be powered on at full frequency. The decision to implement or change power saving modes for each of the assigned processors 30 may be based in part on the topology of the computer system 10, historical and predicted workload demands, and other similar factors. For example, the decision to put resources into a power saving mode may consider the physical/electronic configuration of the resources. Resources may not be equally available to all workloads 50. When the computer system includes hard partitions, for example, resources may be activated or deactivated (i.e., assigned to or removed from a free resource pool) in order to share rights to use those resources, as opposed to the resources themselves. Thus, if a single processor 30 from each of two hard partitions is in a free resource pool, putting one or both of those processors into a power saving mode may inconvenience the workloads 50 executing in the partitions unequally.

Figure 2:
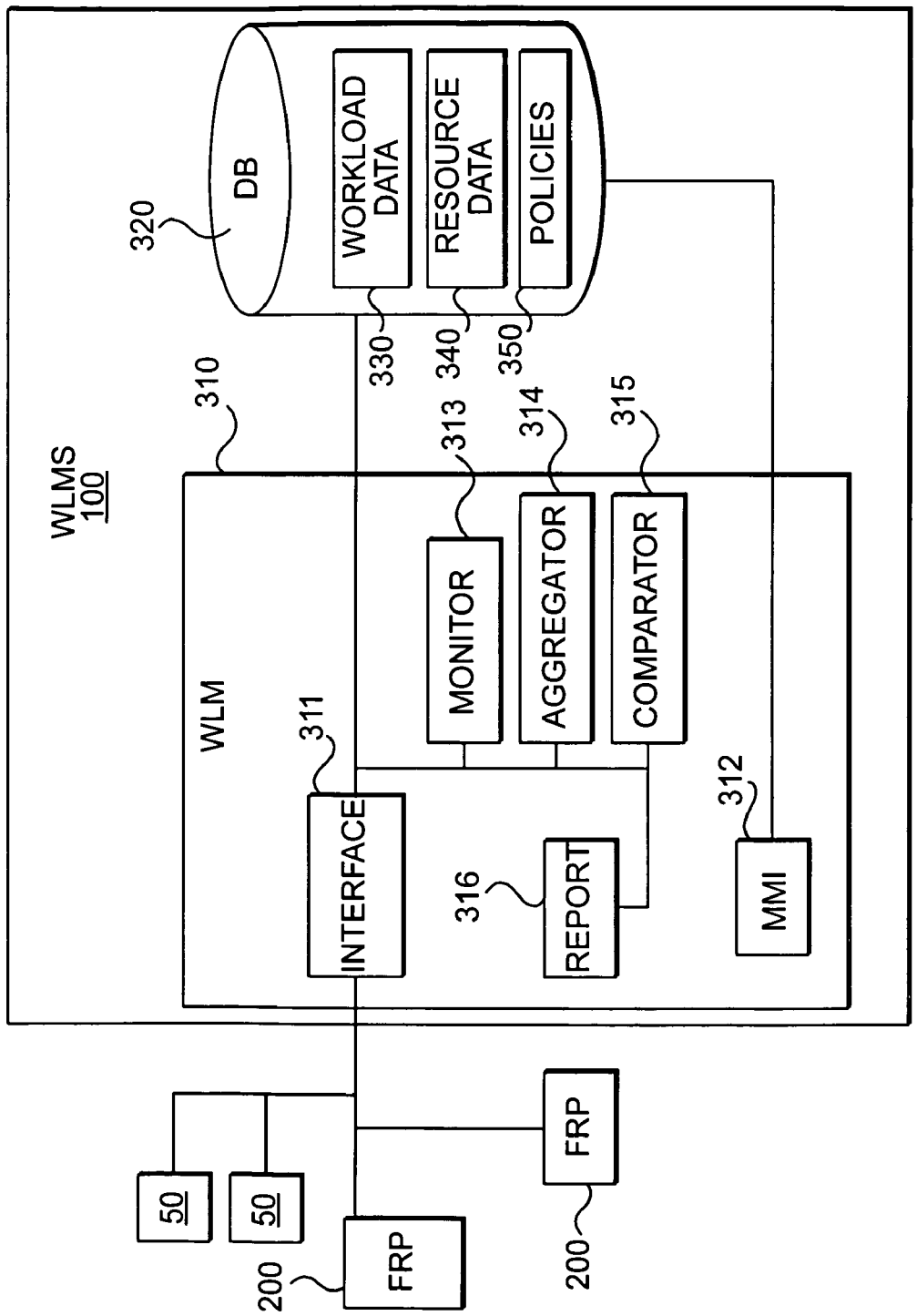
FIG. 2 is a block diagram of an exemplary workload management system (WLMS) that implements management of under utilized computer system resources.

As noted above, in the exemplary computer system 10, the WLMS 100 monitors and manages demand by the workloads 50 and controls assignment of resources to the workloads 50 and to one or more free resource pools 200 so as to conserve energy while ensuring that desired performance targets for the workloads 50 are met. FIG. 2 is a block diagram of exemplary WLMS 100 that manages under-utilized computer system resources. More specifically, the WLMS 100 may be used with the computer system 10 of FIG. 1 to automatically manage workloads 50 executing on the processors of computer system 10 so as to conserve energy consumption when executing the workloads 50 while meeting workload performance targets. The WLMS 100 includes workload manager (WLM) 310 in communication with the workloads 50 and database 320, which may be used to store information related to the performance of the workloads 50 and to individual processors 30, for example.

More specifically, the database 320 may store historical workload demand information 330, other workload information, as disclosed below, resource instance data 340 and policies 350. The workload demand information 330 allows the WLMS 100 to predict changes in workload demand over time. Resource instance data 340 may include performance targets for each resource instance. Policies 350 define rules for allocation of the resource instances to the workloads 50, and may be user-defined, or provided with the computer system and/or the workload 50. Policies 350 also define conditions under which resources are to be assigned to or removed from free resource pools and subsequent to assignment, what, if any, power saving mode changes are to be made to the assigned resources.

The workload manager 310 includes interface module 311, which provides for machine-to-machine interface, including accessing the database 320; man-to-machine interface 312, which is used by a computer system user to implement specific policies, for example; monitor module 313, which monitors and collects performance of the workloads 50 and the processors 30; aggregator 314, which processes and stores the collected performance information; and comparator module 315, which compares the collected and processed performance information to specified targets.

The workload manager 310 may be used to determine which specific resources can be managed, and which user-specified policies may be applicable to that management. For example, a policy may require that processor utilization never exceed 85 percent for an individual processor. Policies also refer to the set of rules that dictate how the workload manager 310 controls the power saving mode of resources assigned to the free resource pools 200. In an embodiment, the workload manager 310 may access the database 320 to determine which workload 50 can be managed according to a specific policy, and which processors 30 can be used to support specific workloads.

The monitor module 313 collects various performance metrics from each processor 30 that is executing for the workload 50. For example, the monitor module 313 may collect individual and aggregate processor utilization over all processors 30, within a server 20, on-which the workload 50 is executing. Such processor utilization may be used as a direct or indirect indication for performance of the workload 50.

The aggregator 330 receives the collected performance metrics, processes the metrics, and produces a "report" 316. The report 316 may be used by other components of the WLMS 100, and may be provided to the computer system user in electronic and hard copy formats. The aggregator 330 may additionally store the processed metric information from the report 316 in the database 320.

The comparator module 340 receives the processed metric information directly from the aggregator 330, or, alternatively, retrieves the processed performance metric information from the database 320. The comparator module 340 then compares the performance information to a set of threshold values.

If the aggregated metrics indicate that a workload 50 can operate within its target range with fewer resources than currently are supporting the workload (e.g., average processor utilization is less than a specified threshold), the workload manager 310 will attempt to select one or more resource instances (e.g., processors 30) that can be placed in a free resource pool (and hence deactivated) while still leaving the workload 50 functioning within its target performance range. Selection criteria may include expected energy savings, current load being handled by the resource, and predicted performance of the workload if the resource is shutdown. Thus, the workload manager 310 will identify a combination of resources to provide the desired performance by the workload 50 while managing under-utilized resources to, for example, conserve energy consumption in the computer system 10.

If the aggregated performance metrics indicate that the workload 50 requires more resources in order to continue to operate within the workload's performance target range (e.g., average processor utilization is greater than a specified threshold), the workload manager 310 will attempt to select one or more resource instances (e.g. processors 30) which, when re-activated, will bring the performance of the workload 50 within its target performance range. Selection criteria may include expected additional energy costs, time required to bring the resource(s) on line, and predicted workload performance if the resource(s) is re-activated As noted above, the processors 30 may be assigned to the free resource pools 200 according to one of several criteria, including as specified in a user-defined policy. For example, a user-defined policy could state that when workload demand drops below 50 percent of resource capacity, one half of the unused resource capacity will be assigned to a free resource pool 200. Another policy might state that other than normal operating hours of 8 am to 4 pm Monday-Friday, the workloads 50 are to receive no more than 50 percent of the available resources to support their demands, and that the unassigned resources are to be placed in a free resource pool 200. Still another policy might specify that only 50 percent of processors are to be used for all workloads 50 unless one or more workloads reach a performance threshold, such as X number of external transactions per hour, in which case, additional processors are assigned, but never to exceed more than 90 percent of resource capacity. Yet another policy might specify that fully-paid for processors are always to be used in preference to pay-per-use processors, even if that means "borrowing" resources by one or more workloads. (In an embodiment of the computer system 10, each workload may be assigned a specific number and/or identity of processors that the workload "owns." These owned resources are always reserved for the owning workload unless that workload does not require the resources, in which case, the resources may be "borrowed" by another workload.) Yet another policy could specify that during time of peak electricity cost (e.g., daylight), more processors will be assigned to the free resource pool 200.

Still another policy might specify that if a processor 30 has not been used to support workload execution over the last 30 minutes, that processor 30 is assigned to a free resource pool 200, and hence deactivated. Historical patterns of processor utilization also may be used to determine when processors should be assigned to free resource pools, and when they should not. For example, during a holiday shopping period, a workload that supports online sales may see increased demand and correspondingly may call for additional processor resources. A policy that ordinarily would assign processors to a free resource pool during historic peak demand times may be waived until after the expected peak activity has subsided. Similarly, a policy that dictates that certain processors in the free resource pool be powered down may be waived until the same peak activity has subsided.

Assignment of a resource to a free resource pool 200 results in the de-activation of that resource. Assignment to a free resource pool 200 also my result in an automatic and coincident change of power saving mode for that resource. Alternatively, or in addition, the power saving mode of each resource in the free resource pool may change as a result of a periodic review, by the WLMS 100, of the resources in the free resource pool 200 and the current and/or predicted demands of the workloads 50. The specific power saving mode actions taken for each assigned resource may depend on the potential short-notice demand for that resource. Such resources, which may be needed on a short-notice basis, may be termed "volatile." The actions initiated for such volatile resources may differ from the actions initiated for "nonvolatile" resources. For example, in order to conserve energy, an unused, or idle, processor simply may be turned off once assigned to a free resource pool 200. However, to restart a powered down processor may impose an unacceptable delay in restoring that processor to its designated workload support role. Another way in which energy consumption may be minimized for a specific processor is to place the processor in a "sleep" mode. Still another way in which energy may be conserved is to lower the operating frequency or clock speed of a processor. The computer system user may provide these or other specific energy-conservation policies for certain processors, or may specify policies that apply to all processors.

Figure 3A:
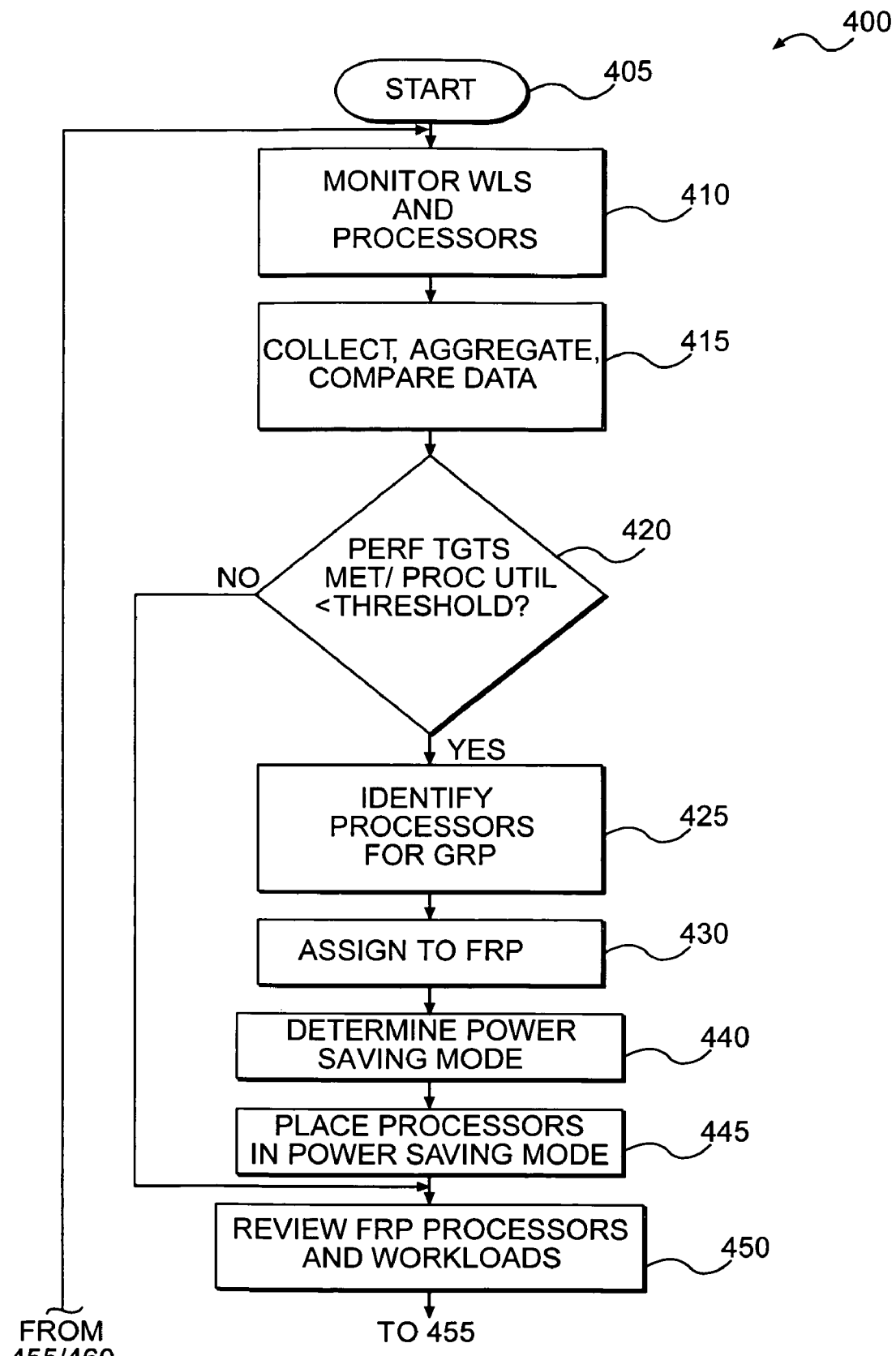
FIGS. 3A and 3B are flowcharts illustrating an exemplary operation of the WLMS of FIG. 2.
Figure 3B:
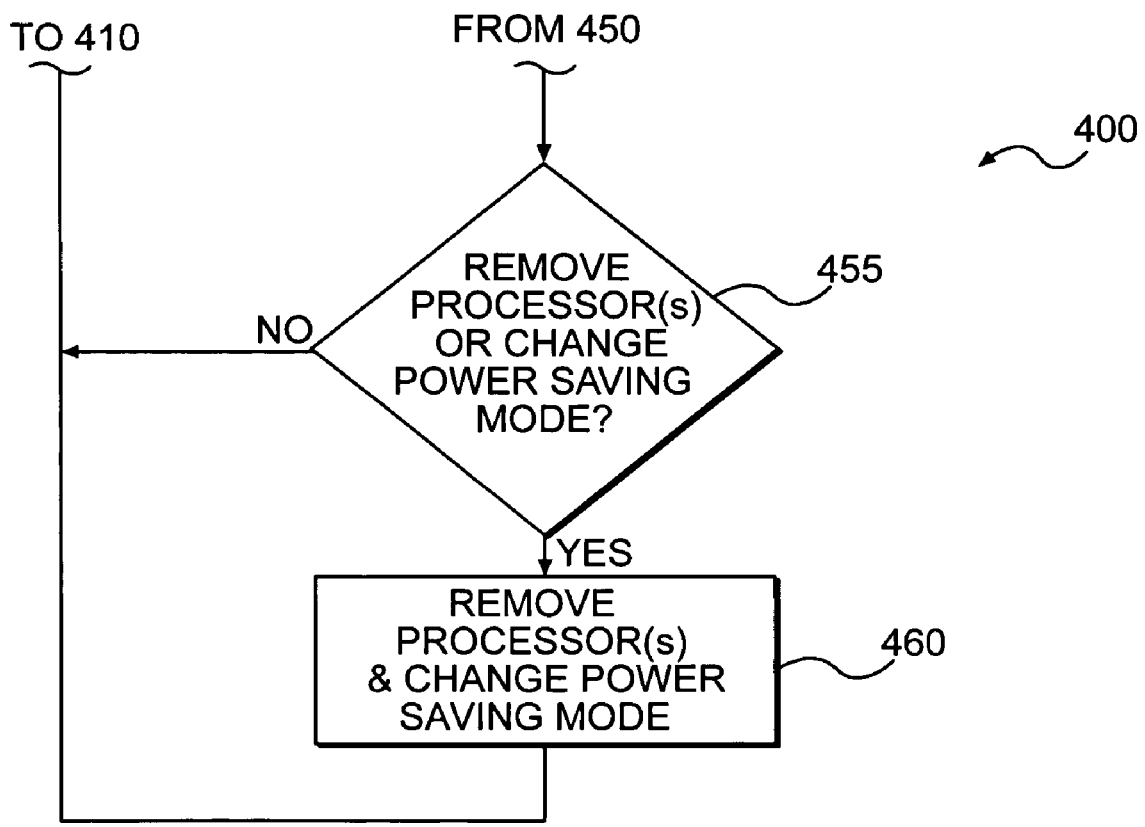

FIGS. 3A and 3B are flowcharts illustrating an exemplary resource management operation 400 of the WLMS 100 of FIGS. 1 and 2. In FIGS. 3A and 3B, resource management operation 400 begins at block 405 with the computer system 10 operating and workloads 50 executing on the processors 30. In block 410, the WLM 310 monitors existing workloads 50 to determine resource utilization and measure existing performance. In block 415, the collected data are aggregated and compared to policies 350 and other stated performance targets or goals. In block 420, if the performance targets (perf tgts) are met, and if processor utilization is less than a specified amount (e.g., total processor utilization is less than 50 percent of resource capacity), then the operation 400 moves to block 425 and one or more processors 30 are identified for assignment to a free resource pool. In block 430, the identified processors 30 are assigned to a free resource pool 200, resulting in de-activation of the assigned processors. In block 420, if the performance targets are not met, the operation 400 moves to block 450. In block 440, the assigned processors 30 are compared to a set of policies 350 stored in the database 320 to determine or reassess power saving or energy conservation actions to be taken with respect to the processors 30. Each assignable processor 30 has one or more specific power saving modes it may enter when assigned to a free resource pool 200. For example, when so assigned, certain processors 30 may be completely powered off while others may be placed a sleep mode. Still other processors 30 may be placed in any possible power saving mode, and may have those power saving modes change depending on the make up of processors 30 in the free resource pool and current and/or predicted workload demand. In addition, the assigned processors 30 may automatically, and coincident with assignment to the free resource pool, enter a power saving mode. Alternatively, one or more, or all of the assigned processors 30 may be placed in a power saving mode upon periodic review by the WLMS 100. In block 445, each assigned processor enters its designated power saving mode.

In block 450, the WLM 310 reviews (either as a result of a periodic review or because performance targets are not met) the processors 30 assigned to the free resource pool 200, and current and/or predicted workload demand to reassess the desired power saving modes of the processors 30 in the free resource pool 200. In block 455, the WLM 310 determines which, if any, of the processors 30 should be removed from the free resource pool 200 and which, if any, of the processors 30 in the free resource pool 200 should have their power saving modes changed (that is, placed in a greater power saving mode or a lesser power saving mode). If the WLM 310 determines that no changes are required, the operation 400 returns to block 410. If the WLM 310 determines that changes should be made, the operation 400 moves to block 460. In block 460, the WLMS 100 implements either removal or power saving mode changes, as appropriate, and as determined in block 455. The operation 400 then returns to block 410.

The invention claimed is:

1. A method for managing under-utilized resources in a computer system, the method implemented on a suitably programmed processor, the method comprising the steps of:
    monitoring performance of workloads executing on the computer system, wherein the workloads consume resources;
    determining resource demand and utilization by the workloads;
    comparing the workload performance to user-defined performance targets and resource utilization by the workloads to user-defined utilization targets;
    using the comparison results, determining, by the processor, if one or more resources is assignable to a free resource pool, wherein assignment of the one or more resources into the free resource pool causes the one or more resources to be deactivated from being available for assignment to a workload; and
    assigning the determined resources to the free resource pool thereby deactivating the assigned one or more resources.

2. The method of claim 1, further comprising changing a power saving mode of the one or more resources assigned to the free resource pool.

3. The method of claim 2, wherein changing the power saving mode comprises powering down the one or more resources assigned to the free resource pool.

4. The method of claim 2, wherein changing the power saving mode comprises placing the one or more resources in a sleep mode assigned to the free resource pool.

5. The method of claim 2, wherein changing the power saving mode comprises reducing operating frequencies of the one or more resources assigned to the free resource pool.

6. The method of claim 2, wherein changing the power saving mode comprises restoring the one or more resources assigned to the free resource pool to a powered on condition.

7. The method of claim 2, wherein changing the power saving mode of the one or more resources assigned to the free resource pool further comprises placing the one or more resources assigned to the free resource pool in the power saving mode coincident with assigning the determined resources to the free resource pool.

8. The method of claim 2, wherein changing the power saving mode comprises changing from a first power saving mode to a second power saving mode.

9. The method of claim 2, wherein changing the power saving mode further comprises changing the power saving mode upon review of the composition of the free resource pool and resource demand by the workloads.

10. The method of claim 9, wherein the review is a periodic review.

11. The method of claim 9, wherein the review is conducted based on the comparison of the workload performance to the user-defined workload targets.

12. The method of claim 9, further comprising the step of removing one or more processors from the free resource pool based on the review.

13. The method of claim 1, wherein the resources are processors.

14. The method of claim 13, wherein the processors are pay-per-use processors.

15. The method of claim 1, wherein the resources are computer systems.

16. A system for managing under-utilized resources in a computer system having one or more resources supporting execution of one or more workloads, the system for managing under-utilized resources implemented as programming on a programmable device, the system, comprising:
 a workload manager that manages the resources and monitors the workloads, comprising:
  a monitor module that measures attributes, said attributes comprising current resource utilization, workload demand, and workload performance,
  an aggregator module the receives the measured attributes and aggregates the measured attributes to produce a total data set, and
  a comparator that receives the measured and aggregated attributes, compares the received attributes to a set of performance standards and user-defined policies, and determines which of the resources are under-utilized; and
 a free resource pool that defines a plurality of resources that have been determined to be under-utilized, wherein assignment to the free resource pool de-activates the assigned resources from being available for assignment to a workload.

17. The system of claim 16, wherein placing a resource in the free resource pool allows a change to an energy conservation mode of the resource.

18. The system of claim 17, wherein the energy conservation mode comprises powering down the resource.

19. The system of claim 17, wherein the energy conservation mode comprises placing the resource in a sleep mode.

20. The system of claim 17, wherein the energy conservation mode comprises reducing operating frequency of the resource.

21. The system of claim 16, wherein the resources are processors.

22. The system of claim 16, wherein the resources are computer systems.

* * * * *

UNITED STATES PATENT AND TRADEMARK OFFICE
CERTIFICATE OF CORRECTION

| | | |
|---|---|---|
| PATENT NO. | : 8,271,818 B2 | Page 1 of 1 |
| APPLICATION NO. | : 12/453148 | |
| DATED | : September 18, 2012 | |
| INVENTOR(S) | : William H. Blanding | |

It is certified that error appears in the above-identified patent and that said Letters Patent is hereby corrected as shown below:

On the Title page, in Item (54), and in the specifications, column 1, line 2, Title, after "COMPUTER" insert -- SYSTEM --.

In the Claims:

In column 9, line 24, in Claim 16, after "module" delete "the" and insert -- that --, therefor.

Signed and Sealed this
Twenty-first Day of May, 2013

Teresa Stanek Rea
*Acting Director of the United States Patent and Trademark Office*